Jan. 16, 1940.  E. O. SCHWEITZER, JR  2,187,179
ELECTRIC MOTOR CONSTRUCTION
Filed Dec. 2, 1937
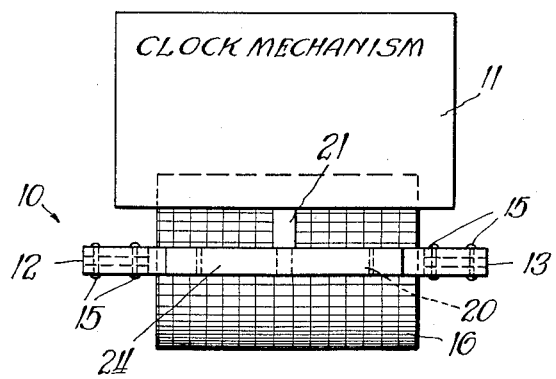
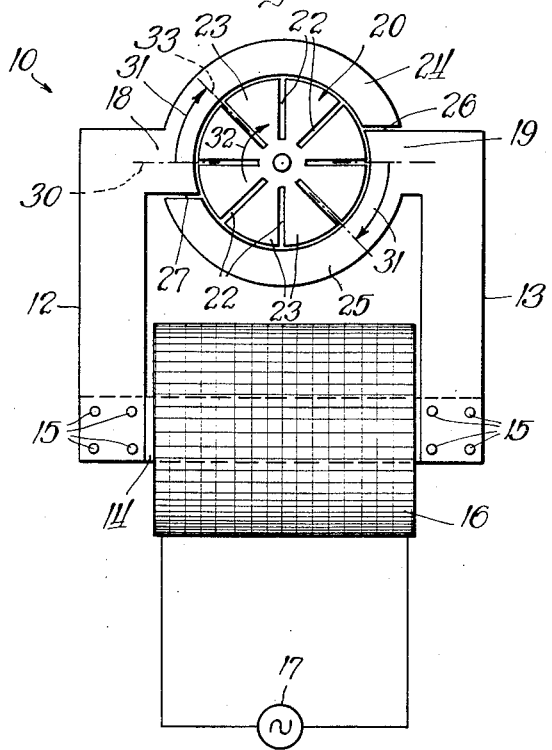
Inventor:
Edmund O. Schweitzer, Jr.

Patented Jan. 16, 1940

2,187,179

UNITED STATES PATENT OFFICE 2,187,179

ELECTRIC MOTOR CONSTRUCTION

Edmund O. Schweitzer, Jr., Northbrook, Ill.

Application December 2, 1937, Serial No. 177,706

13 Claims. (Cl. 172—275)

My invention relates, generally, to electric motors, and it has particular relation to self-starting, synchronous, single phase, alternating current motors adapted primarily for use in driving time keeping apparatus, such as clock mechanisms, time switch mechanisms, and the like.

The object of my invention, generally stated, is to provide an electric motor of this type which shall be efficient in operation and which may be readily and economically manufactured.

An object of my invention is to provide a slow speed synchronous motor that is self-starting when energized from a single phase source of alternating current without requiring a transfer of magnetic energy into electrical energy and then back again into magnetic energy for starting.

Another object of my invention is to provide a slow speed synchronous motor that is self-starting when energized from a single phase source of alternating current without requiring the use of shading coils.

A further object of my invention is to provide for shifting the magnetic axis of each pulsation of alternating magnetic flux in a motor having a C-shaped core structure during each flux pulsation without requiring the use of shading coils.

Still another object of my invention is to provide for shifting the magnetic axis of each pulsation of alternating magnetic flux in a motor having a C-shaped core structure during each flux pulsation through the provision of a polar extension on each polar projection of the core structure and to employ the shifting magnetic field generated thereby to bring a rotor, formed of magnetic material having radial slots providing a plurality of poles, up to a running speed that is determined by the frequency of the alternating current and the number of poles.

Other objects of my invention will, in part, be obvious and in part appear hereinafter.

My invention, accordingly, is disclosed in the embodiment thereof shown in the accompanying drawing, and it comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawing, in which:

Figure 1 is a top plan view of my improved motor construction; and

Figure 2 is a front elevation of the improved motor construction.

Referring now particularly to the figures shown in the drawing, it will be observed that the reference character 10 designates, generally, an electric motor that is arranged to drive a clock mechanism 11. The clock mechanism 11 may be employed solely for time-keeping purposes, or it may be employed for operating an electric switch at certain predetermined intervals. Obviously other uses may be made of the clock mechanism as desired.

The motor 10 includes a magnetic core structure which comprises end legs 12 and 13 and an intermediate leg 14. As illustrated, the core structure comprising these legs is generally C-shaped. The legs are composed of magnetic material such as mild steel or soft iron or silicon steel. Moreover, the parts making up the core structure may either be solid or laminated as desired. The end legs 12 and 13 extend substantially parallel to each other from the ends of the intermediate leg 14 and, as illustrated, they may be dovetailed therewith and secured thereto by any suitable means such as rivets 15.

A winding 16 comprising several turns of suitable conductor is positioned on the intermediate leg 14. As shown, the winding 16 is intended to be energized from a single phase source of alternating current, such as indicated at 17.

At their outer ends the legs 12 and 13 are provided with polar projections 18 and 19, respectively, which extend toward each other. Between the opposed inner ends of the polar projections 18 and 19 a rotor 20 is rotatably mounted on a shaft 21 that may be carried by the clock mechanism 11. Obviously the shaft 21 may be independently mounted in bearings carried by the core structure or by separately supported bearings on each side of the rotor 20 as may be desired.

The rotor 20 is formed of conducting magnetic material such as mild steel or soft iron or silicon steel. It may be a relatively thin disc member and may either be of solid or laminated construction.

With a view to causing the rotor 20 to rotate at a synchronous speed which is a function of the frequency of the alternating current source 17, it is provided with a plurality of radial slots 22, thereby making sector shaped pole portions 23. As illustrated in the drawing, eight radial slots 22 are provided, thereby providing eight pole portions 23. When the alternating current source 17 has a frequency of sixty cycles per second, the rotor 20, having eight pole portions 23, will rotate at a synchronous speed of nine hundred revolutions per minute. Obviously a greater or a lesser number of slots 22 may be provided in the rotor 20 to cause it to rotate at different speeds which, for a given frequency of alternating current, will depend upon the number of pole portions that are present.

While the construction of the motor 10 as thus far described will operate at a synchronous speed of nine hundred revolutions per minute, it is necessary to bring it up to this speed by some means. In the past, this means has ordinarily taken the form of one or more shading coils located in the polar projections 18 and 19. By means of these shading coils a shifting magnetic field is generated which is capable of bringing the rotor of the motor up to synchronous speed. The provision of shading coils entails the transfer of the magnetic energy of the magnetic field generated by the winding 16 into electrical energy in the form of short circuit currents flowing in the shading coils. These short circuit currents then generate magnetic fields which are in time and space displacement from the magnetic field generated by the winding 16. This transfer of energy from one form to another introduces losses which are undesirable. At the same time such a construction, while satisfactory for starting, is likely to cause the rotor to exceed its synchronous speed as determined by the number of poles thereof and the frequency of the alternating current. In the past it has been necessary to effect a compromise between the torque created by the shifting magnetic field as a result of the provision of shading coils and the synchronous torque that is generated by the pulsating field of the winding 16.

According to my invention, I dispense entirely with the use of shading coils and their attendant disadvantages and rely solely upon magnetic means for obtaining a shifting of the axis of the magnetic field in such manner as to bring the rotor 20 up to synchronous speed and to maintain it at this speed. For this purpose polar extensions 24 and 25 of magnetic material are provided on the polar projections 18 and 19 of the end legs 12 and 13, respectively. These polar extensions 24 and 25, as illustrated, extend around the rotor 20 toward the other polar projection and are spaced therefrom by suitable air gaps 26 and 27. Obviously, these air gaps 26 and 27 may be closed by non-magnetic material, if a more rigid core structure is desired.

During the initial part of each pulsation of the alternating magnetic flux, its axis may be considered to be substantially along the broken line 30 and substantially coaxial with the polar projections 18 and 19. As the flux density increases during the next portion of each pulsation, this axis tends to shift from the position indicated by the broken line 30 in the direction of the arrows 31 and about the center of the rotor 20. This shifting of the magnetic axis is effective to cause the rotor 20 to rotate in the direction indicated by the arrow 32 and to increase its speed until it reaches the synchronous speed, in this case nine hundred revolutions per minute, which is determined by the frequency of the alternating current source 17 and the number of pole portions 23 of the rotor 20. When the rotor 20 reaches this synchronous speed, the shift of the magnetic axis during each pulsation of the alternating magnetic flux is limited by the distance through which each pole portion 23 moves during each pulsation. Therefore, at running speed the magnetic axis may be considered to shift from a position along the broken line 30 to a position along the broken line 33. Since the extent of shift of the magnetic axis during each pulsation is controlled by the arcuate length of the pole portions 23, there is no tendency for the rotor 20 to exceed its synchronous speed.

It will be apparent that the cost of construction of the motor 10 is comparatively little. Since no shading coils are required, the construction of the core structure is materially simplified. Both legs 12 and 13 and the rotor 20 may be stamped out by a single operation. If desired, the intermediate leg 14 can be made integral with one of the end legs 12 and 13, or portions of it may be made integrally with both of the end legs 12 and 13.

Since certain further changes may be made in the above construction and different embodiments of the invention may be made without departing from the scope thereof, it is intended that all matter contained in the foregoing description or shown in the accompanying drawing shall be interpreted as illustrative and not in a limiting sense.

I claim as my invention:

1. An electric motor comprising, in combination, a generally C-shaped stator of magnetic material having a pair of polar projections, a rotor of electrically conducting material disposed between said polar projections, winding means on said C-shaped stator intermediate its ends for connection to a current source capable of producing a pulsating magnetic field between said polar projections, and only one arcuate polar extension of magnetic material extending from each polar projection toward the other polar projection so as to continuously shift the axis of the magnetic flux in each pulsation from its initial position in said polar projections whereby said rotor is started from rest in the direction of said polar extensions, said shift being effected without converting the magnetic energy of the pulsating magnetic field into electrical energy and then back into magnetic energy.

2. A self-starting electric motor comprising, in combination, a generally C-shaped field member having pole members, winding means intermediate the ends of said C-shaped field member for producing a pulsating magnetic field between said pole members, a relatively rotatable member of electrically conducting material disposed between said pole members, and only one polar projection of magnetic material extending from each pole member around said relatively rotatable member toward the other pole member for by itself shifting the axis of the magnetic field during each pulsation of the flux relative to the magnetic axis of each pole member in an amount sufficient to make the motor self-starting.

3. A self-starting single phase alternating current motor comprising, in combination, a generally C-shaped field member having pole members, winding means intermediate the ends of said C-shaped field member for producing an alternating magnetic field between said pole members, a relatively rotatable member having magnetizable material forming a polar construction disposed between said pole members, and a polar projection of magnetizable material extending from each pole member around said relatively rotatable member for by itself shifting the axis of the magnetic field in the direction of the same and away from the magnetic axis of each pole member during each half cycle of the alternating flux in an amount sufficient to make the motor self-starting.

4. A self-starting single phase alternating current motor comprising in combination; a magnetic core structure including an intermediate leg and end legs disposed substantially parallel to each other and said end legs having polar projections extending toward each other, winding means on said core structure for connection to a source of single phase alternating current, a rotor of electrically conducting material rotatably mounted between said polar projections, and polar extension means of magnetic material cooperating with said polar projections in such manner as to continuously shift the magnetic axis of the magnetic flux during each pulsation from its initial position in said polar projections whereby said rotor is started from rest in the direction in which said means extends.

5. A self-starting single phase alternating current motor comprising, in combination; a magnetic core structure including an intermediate leg and end legs disposed substantially parallel to each other and said end legs having polar projections extending toward each other; winding means on said core structure for connection to a source of single phase alternating current, a rotor of electrically conducting material rotatably mounted between said polar projections, and a polar extension of magnetic material extending from each polar projection toward the other polar projection and spaced therefrom for continuously shifting the magnetic axis of the magnetic flux in each pulsation in the direction of the former from its initial position in the latter whereby said rotor is started from rest in the direction in which said polar extensions extend.

6. A self-starting synchronous single phase alternating current motor comprising, in combination; a magnetic core structure including an intermediate leg and end legs disposed substantially parallel to each other and said end legs having polar projections extending toward each other; winding means on said core structure for connection to a source of single phase alternating current, a relatively rotatable member having magnetizable material forming a polar construction disposed between said polar projections, and polar extension means of magnetic material cooperating with said polar projections in such manner as to continuously shift the magnetic axis of the magnetic flux in each pulsation from its initial position in said polar projections whereby said rotor is started from rest in the direction in which said means extends.

7. A self-starting synchronous single phase alternating current motor comprising, in combination; a magnetic core structure including an intermediate leg and end legs disposed substantially parallel to each other and said end legs having polar projections extending toward each other; winding means on said core structure for connection to a source of single phase alternating current, a relatively rotatable member having magnetizable material forming a polar construction disposed between said polar projections, and a polar extension of magnetic material extending from each polar projection toward the other polar projection and spaced therefrom for continuously shifting the magnetic axis of the magnetic flux in each pulsation in the direction of the former from its initial position in the latter whereby said rotor is started from rest in the direction in which said polar extensions extend.

8. A self-starting synchronous single phase alternating current motor comprising, in combination; a magnetic core structure including an intermediate leg and end legs disposed substantially parallel to each other and said end legs having polar projections extending toward each other; winding means on said core structure for connection to a source of single phase alternating current, a rotor comprising a disc of magnetic material rotatably mounted between said polar projections and having radial slots therein to provide the effect of a plurality of pole members, and polar extension means of magnetic material cooperating with said polar projections in such manner as to continuously shift the magnetic axis of the magnetic flux in each pulsation from its initial position in said polar projections whereby said rotor is started from rest in the direction in which said means extends, the running speed of said rotor being determined by the number of pole members and the frequency of said alternating current source and the shift of the magnetic flux during each pulsation thereof at running speed being limited substantially to the arc through which a pole member moves during each pulsation of the magnetic flux.

9. A self-starting synchronous single phase alternating current motor comprising, in combination; a magnetic core structure including an intermediate leg and end legs disposed substantially parallel to each other and said end legs having polar projections extending toward each other; winding means on said core structure for connection to a source of single phase alternating current, a rotor comprising a disc of magnetic material rotatably mounted between said polar projections and having radial slots therein to provide the effect of a plurality of pole members, and a polar extension of magnetic material extending from each polar projection toward the other polar projection and spaced therefrom for continuously shifting the magnetic axis of the magnetic flux in each pulsation in the direction of the former from its initial position in the latter whereby said rotor is started from rest in said direction, the running speed of said rotor being determined by the number of pole members thereof and the frequency of said alternating current source and the shift of the magnetic flux during each pulsation thereof at running speed being limited substantially to the arc through which a pole member moves during each pulsation of the magnetic flux.

10. An electric motor comprising, in combination, core means of magnetic material providing pole sections at its ends, winding means on said core means for connection to an alternating current source, only one arcuate polar projection of magnetic material extending from each pole section toward the adjacent side of the other pole section with a high reluctance gap therebetween whereby a magnetic circuit unsymmetrical with respect to each pole section is provided, and a rotor including magnetic material forming a polar construction mounted to cooperate with said pole sections and polar projections and operating at a speed determined by the frequency of said alternating current source and the number of poles of said polar construction, said polar projections and said rotor constituting the sole circuit of magnetic material between said pole sections whereby substantially all of the magnetomotive force generated by said winding means is available for turning said rotor.

11. An electric motor comprising, in combination, core means of magnetic material providing pole sections at its ends, winding means on said core means for connection to an alternating current source, only one arcuate polar projection of magnetic material extending from each pole section toward the adjacent side of the other pole section with a high reluctance gap therebetween whereby a magnetic circuit unsymmetrical with respect to each pole section is provided, and a rotor including magnetic material forming a polar construction mounted to cooperate with said pole sections and polar projections and operating at a speed determined by the frequency of said alternating current source and the number of poles of said polar construction; said core means, pole sections, arcuate polar projections, and rotor being positioned in substantially the same plane.

12. An electric motor comprising, in combination, core means of magnetic material providing pole sections at its ends, winding means on said core means for connection to an alternating current source, only one arcuate polar projection of magnetic material extending from each pole section toward the adjacent side of the other pole section with a high reluctance gap therebetween whereby a magnetic circuit unsymmetrical with respect to each pole section is provided, and a rotor including magnetic material forming a polar construction mounted to rotate within said pole sections and polar projections at a speed determined by the frequency of said alternating current source and the number of poles of said polar construction, said polar projections and said rotor constituting the sole circuit of magnetic material between said pole sections whereby substantially all of the magnetomotive force generated by said winding means is available for turning said rotor.

13. An electric motor comprising, in combination, core means of magnetic material providing pole sections at its ends, winding means on said core means for connection to an alternating current source, only one arcuate polar projection of magnetic material extending from each pole section toward the adjacent side of the other pole section with a high reluctance gap therebetween whereby a magnetic circuit unsymmetrical with respect to each pole section is provided, and a rotor comprising a disc of magnetic material rotatably mounted between said pole sections and polar projections and having radial slots therein to provide a plurality of pole members and operating at a speed determined by the frequency of said alternating current and the number of said pole members, said polar projections and said rotor constituting the sole circuit of magnetic material between said pole sections whereby substantially all of the magnetomotive force generated by said winding means is available for turning said rotor.

EDMUND O. SCHWEITZER, Jr.